United States Patent [19]

Medina

[11] Patent Number: 5,650,543
[45] Date of Patent: Jul. 22, 1997

[54] ETHOXYLATED ACETYLENIC GLYCOLS HAVING LOW DYNAMIC SURFACE TENSION

[75] Inventor: Steven Wayne Medina, Orefield, Pa.

[73] Assignee: Air Products and Chemicals, Inc., Allentown, Pa.

[21] Appl. No.: 524,129

[22] Filed: Aug. 31, 1995

Related U.S. Application Data

[63] Continuation of Ser. No. 158,672, Nov. 29, 1993, abandoned.

[51] Int. Cl.$^6$ .................................................. C07C 43/15
[52] U.S. Cl. .................................................. 568/616
[58] Field of Search .................................................. 568/616

[56] References Cited

U.S. PATENT DOCUMENTS 3,268,593  8/1966  Carpenter et al. .
4,117,249  9/1978  DeSimone et al. .

FOREIGN PATENT DOCUMENTS 44-20450  9/1969  Japan ..................................... 568/616

OTHER PUBLICATIONS

Schwartz, Joel "The Importance of Low Dynamic Surface Tension in Waterborne Coatings" Journal of Coatings Technology (1992).

Primary Examiner—Johann Richter
Assistant Examiner—John D. Peabody, III
Attorney, Agent, or Firm—Russell L. Brewer; William F. Marsh

[57] ABSTRACT

This invention relates to ethoxylated acetylenic glycol compositions represented by the formula:

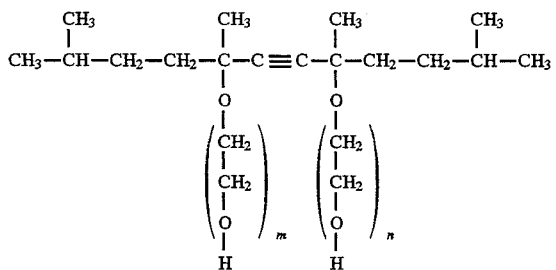

wherein m and n are integers and the sum is from 4–12.

These ethoxylated acetylenic diols are excellent as surfactants alone or admixed with other surfactants for use in water borne coatings.

3 Claims, No Drawings

ETHOXYLATED ACETYLENIC GLYCOLS HAVING LOW DYNAMIC SURFACE TENSION

This application is a file-wrapper continuation of application Ser. No. 08/158,672 filed on Nov. 29, 1993, now abandoned.

FIELD OF THE INVENTION

This invention relates to ethoxylated acetylenic glycols suitability as a surfactant for aqueous coating systems.

BACKGROUND OF THE INVENTION

The waterborne coatings and ink industries require surfactants that provide excellent surface tension reducing capabilities for substrate wetting. Equilibrium surface tension performance is important when the system is at rest. End-users also need surfactants with good dynamic performance which is a measure of a surfactant's ability to provide wetting under high speed application such as when coatings are spray applied or inks are printed.

Traditional nonionic surfactants such as alkylaryl or alcohol ethoxylates, and ethylene oxide (EO)-propylene oxide (PO) copolymers have excellent equilibrium surface tension performance but are generally characterized as having poor dynamic surface tension reduction. In contrast, certain anionic surfactants such as sodium dialkyl sulfosuccinates can provide good dynamic results, but these are very foamy and impart water sensitivity to the finished coating.

Surfactants based on acetylenic glycols such as 2,4,7,9-tetramethyl-5-decyne-4,7-diol and its ethoxylates are known for their good balance of equilibrium and dynamic surface tension reducing capabilities with little of the negative features of traditional nonionic and anionic surfactants. The molecules, however, may not provide the very low surface tension reduction needed for the wetting of contaminated surfaces or low surface energy substrates. In those cases, end-users may require silicone or fluorocarbon based surfactants which may be costly, foamy, exhibit poor dynamic performance and often cause adhesion problems.

The following patents and articles describe various acetylenic alcohols and their ethoxylates as surface active agents:

U.S. Pat. No. 3,268,593 discloses ethyleneoxide adducts of tertiary acetylenic alcohols represented by the structural formula

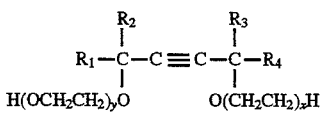

wherein $R_1$ and $R_4$ are alkyl radicals having from 3–10 carbon atoms and $R_2$ and $R_3$ are methyl or ethyl and x and y have a sum in the range of 3 to 60, inclusive. Specific ethyleneoxide adducts include the ethyleneoxide adducts of 3-methyl-1-nonyn-3-ol; 7,10-dimethyl-8-hexadecyne-7,10-diol; 2,4,7,9-tetramethyl-5-decyne-4,7-diol; and 4,7-dimethyl-5-decyne-4,7-diol. Preferably, the ethyleneoxide adducts range from 3 to 20 units. The patentees point out that these ethyleneoxide adducts have outstanding wetting property and that the presence of the acetylenic bond in the hydrophobic chain increases water solubility and improves surfactant properties. As the oxyethylene chain link increases, both detergency and amount of foam increase, and the wetting times decrease with increasing polyoxyethylene chain length.

U.S. Pat. No. 4,117,249 discloses acetylenic glycols represented by the structural formula

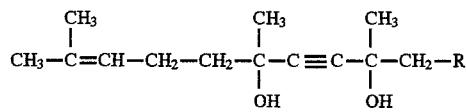

wherein R is hydrogen or an alkenyl radical. The acetylenic glycols are acknowledged as having utility as surface active agents and they can be used as wetting agents, dispersants, antifoaming nonionic agents and viscosity stabilizers.

In an article, Schwartz, *The Importance of Low Dynamic Surface Tension in Waterborne Coatings*, Journal of Coatings Technology (1992), there is discussion of surface tension properties in waterborne coatings and a discussion of dynamic surface tension in such coatings. Equilibrium surface and dynamic surface tension are evaluated for several surface active agents including the ethyleneoxide adducts of acetylenic glycol, e.g., the 4,7-ethyleneoxide the 3.5 mole adduct of 2,4,7,9-tetramethyl-5-decyne-4,7-diol where the number of ethyleneoxide units ranges from about 1.3 to 30, as well as the acetylenic glycols themselves, and ethyleneoxide adducts of other aromatic and aliphatic alcohols, e.g., nonylphenol and lauryl alcohol. At a concentration of 0.1% in distilled water, the dynamic surface tension ranges from a low of about 32 to a high of 72 dynes per centimeter.

SUMMARY OF THE INVENTION

This invention pertains to an ethoxylated 2,5,8,11-tetramethyl-6-dodecyne-5,8-diol. The ethoxylated acetylenic glycol is represented by the formula:

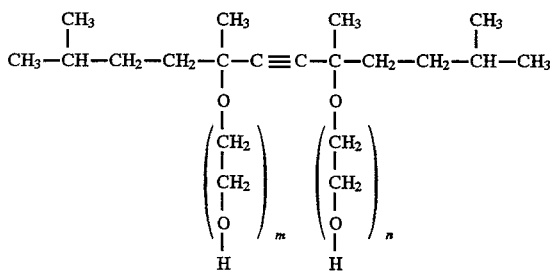

wherein m and n are integers and the sum is from 2–50, preferably 4–10.

There are significant advantages associated with the ethoxylated acetylenic glycol of this invention and these advantages include:

an ability to formulate water borne coatings and inks having excellent resistance to water;

an ability to produce water borne coatings and inks which may be applied to a variety of substrates with excellent wetting of substrate surfaces including contaminated and low energy surfaces;

an ability to provide a reduction in coating or printing defects such as orange peel and flow/leveling deficiencies;

an ability to produce water borne coatings and inks which have low volatile organic content thus making these surfactants environmentally favorable; and an ability to formulate coating and ink compositions capable of high speed application.

DETAILED DESCRIPTION OF THE INVENTION

The surfactants of this invention are ethoxylates of 2,5,8,11-tetramethyl-6-dodecyne-5,8-diol. These ethoxylates, because of their ability to decrease the surface tension of aqueous systems, have wide utility in formulating coating and ink formulations. The moles ethoxylate per mole of acetylenic glycol range from 2–50, preferably 3–10 and most preferably 4–7. When the moles ethoxylate ranges below the lower end of the scale, and when the ethoxylate ranges above the upper end of the scale, properties of the aqueous system may deteriorate.

The ethoxylates may be applied to a variety of substrates and these include metals, organic (e.g. oil) contaminated surfaces, plastics, composites, wood, glass, ceramics and other substrates that are printed or require a protective/decorative coating.

The ethoxylates may be combined with other surface active agents, e.g., dioctylsodium sulfosuccinate and ethoxylated alcohols, e.g., ethoxylated $C_{5-12}$ alkyl phenols and higher (8–16) alkanols. Surfactant levels typically range from 50–90 parts ethoxylated acetylenic glycol composition per 10–50 parts conventional surfactant.

Representative water based coating and ink formulations to which the ethoxylated acetylenic glycols may be added are as follows:

| Typical Water Based Coating Formulation | |
|---|---|
| 0 to 50 wt % | Pigment Dispersant/Grind Resin |
| 0 to 80 wt % | Coloring Pigments/Extender Pigments/Anti-Corrosive Pigments other pigment types |
| 5 to 99.9 wt % | Waterborne/Water Dispersible/Water-soluble Resins |
| 0 to 30 wt % | Slip Additives/Antimicrobials Processing Aids/Defoamers |
| 0 to 50 wt % | Coalescing or Other Solvents |
| 0.01 to 10 wt % | Surfactant/Wetting Agent/Flow and Leveling Agents |
| 0 to 50 wt % | Pigment Dispersant/Grind Resin |
| 0 to 80 wt % | Coloring Pigments/Extender Pigments other pigment types |
| 5 to 99.9 wt % | Waterborne/Water Dispersible/Water-soluble Resins |
| 0 to 30 wt % | Slip Additives/Antimicrobials Processing Aids/Defoamers |
| 0 to 50 wt % | Coalescing or Other Solvents |
| 0.01 to 10 wt % | Surfactant/Wetting Agent/Flow and Leveling Agents |

The ethoxylated derivatives of this invention may be prepared in a manner similar to that used in producing the corresponding ethoxylated tertiary acetylenic glycols which are homologs and analogs to the derivatives described herein. Typically these involve the reaction of an aliphatic ketone with acetylene in the presence of potassium hydroxide followed by reaction with preselected molar levels of ethylene oxide. The outstanding surface tension reduction performance and other properties of the tetramethyldodecynediol ethoxylates are illustrated in the following examples.

EXAMPLE 1

Comparative Evaluation of Surfactant Systems

A series of aqueous systems were prepared for determining the effect of various surfactants on equilibrium and dynamic surface tension. Aqueous systems containing 0.14 of active surfactant were evaluated. In preparing the ethoxylated acetylenic glycols, ethylene oxide was reacted with the surfactant base glycol. The moles EO represents the number of moles ethylene oxide reacted per mole of base glycol. The results are as follows:

| Surfactant | Moles Ethyleneoxide | 0.1 wt % in Water Surface Tension, dynes/cm | |
|---|---|---|---|
| Base Glycol | Per Mole Glycol | Equilibrium | Dynamic |
| 104* | 1.3 | 32 | 35.1 |
| 104 | 3.5 | 34 | 37.3 |
| 104 | 10 | 43.1 | 46 |
| 104 | 30 | 48.2 | 50.2 |
| 124** | 4 | 26.7 | 31.2 |
| 124 | 6 | 26.6 | 29.8 |
| 124 | 10 | 29.6 | 32.7 |

*104 is a designation for 2,4,7,9-tetramethyl-5-decyne-4,7-diol sold under the trademark Surfynol.
**124 is a designation for 2,5,8,11-tetramethyl-6-dodecyne-5,8-diol.

The above comparative studies confirms the superior wetting capabilities of the ethoxylated dodecynediol surfactants, particularly at a level of about 6 moles (5–7) ethylene oxide over other high performance ethoxylated acetylenic glycol based surfactants. In contrast to the ethoxylate of 2,4,7,9-tetramethyl-5-decyne-4,7-diol, the ethoxylated 2,5,8,11-tetramethyl-6-dodecyne-5,8-diol surfactants imparted much lower equilibrium and dynamic surface tension at the lower ethoxylate levels.

EXAMPLE 2

To determine the effectiveness of the surfactant properties with other surfactant compositions, the ethoxylated derivatives of 2,5,8,11-tetramethyl-6-dodecyne-5,8-diol were mixed with other conventional surfactants. These included ethoxylated derivatives of nonyl phenol, acetylenic glycols and diocytlsodiumsulfosuccinate (DOSS). The results are shown in Table 2.

| Surfactant | Ratio Wt. | Moles Ethyleneoxide | 0.1 wt % in Water; Surface Tension, dynes/cm | |
|---|---|---|---|---|
| Base Glycol | Parts | Per Mole Glycol | Equilibrium | Dynamic |
| 124/CO-730<sup>a</sup> | 75/25 | 6 | 25.5 | 30.2 |
| 124/DOSS | 75/25 | 6 | 24.9 | 27.7 |
| 124/Surfynol 420<sup>b</sup> | 90/10 | 6 | 24.4 | 27.3 |
| 124/CO-730 | 75/25 | 4 | 25.4 | 30.7 |
| 124/DOSS | 75/25 | 4 | 25.5 | 31.7 |

<sup>a</sup>Nonyl phenol ethoxylate.
<sup>b</sup>Surfynol 420 is a designation for the 1.3 mole ethoxylate of 2,4,7,9-tetramethyl-5-decyne-4,7-diol.

The above results show that favorable surfactant properties can be achieved by combining the ethoxylated derivative of 2,5,8,11-tetramethyl-6-dodecyne-5,8-diol with conventional surfactants. The results appear to show some synergism in that considerably lower equilibrium and dynamic surface tension results were obtained with the admixture than were obtained obtained with the ethoxylated derivative alone.

What is claimed is:
1. An ethoxylated acetylenic glycol composition the formula:
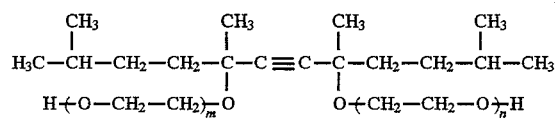
wherein m and n are integers and the sum is from 2–50.
2. The composition of claim 1 wherein the sum of m plus n is from 3–10.
3. The composition of claim 1 wherein the sum of m plus n is from 4–7.
* * * * *